United States Patent
Schall et al.

(10) Patent No.: US 8,841,380 B2
(45) Date of Patent: Sep. 23, 2014

(54) POLYURETHANE COATING COMPOSITIONS COMPRISING ISOCYANURATE COMPOSITIONS FROM BIS(ISOCYANATOMETHYL) CYCLOHEXANE AND TERTIARY AMINE CATALYSTS

(75) Inventors: Donald C. Schall, Lansdale, PA (US); Jia Tang, Ambler, PA (US)

(73) Assignee: Rohm and Haas Company, Philadelphia, PA (US)

(*) Notice: Subject to any disclaimer, the term of this patent is extended or adjusted under 35 U.S.C. 154(b) by 269 days.

(21) Appl. No.: 13/297,499

(22) Filed: Nov. 16, 2011

(65) Prior Publication Data

US 2012/0130002 A1 May 24, 2012

Related U.S. Application Data

(60) Provisional application No. 61/416,008, filed on Nov. 22, 2010.

(51) Int. Cl.
| | | |
|---|---|---|
| C08F 8/30 | (2006.01) | |
| C08F 20/00 | (2006.01) | |
| C08G 18/00 | (2006.01) | |
| C08G 18/08 | (2006.01) | |
| C08G 18/18 | (2006.01) | |
| C08G 18/20 | (2006.01) | |
| C08G 18/22 | (2006.01) | |
| C08G 18/28 | (2006.01) | |
| C08G 63/00 | (2006.01) | |
| C08G 73/00 | (2006.01) | |
| C08J 3/00 | (2006.01) | |
| C08K 3/20 | (2006.01) | |
| C08L 75/00 | (2006.01) | |

(52) U.S. Cl.
USPC ........... 524/590; 524/507; 524/589; 524/591; 524/839; 524/840; 525/123; 525/440.01; 525/455; 528/44; 528/53; 528/54; 528/55; 528/85

(58) Field of Classification Search
USPC ................ 524/507, 589, 590, 591, 839, 840; 525/123, 440.01, 455; 528/44, 53, 54, 528/55, 85

See application file for complete search history.

(56) References Cited

U.S. PATENT DOCUMENTS

| | | |
|---|---|---|
| 4,647,623 A | 3/1987 | Kase et al. |
| 5,506,328 A * | 4/1996 | Chandalia et al. ............. 528/49 |
| 5,663,272 A | 9/1997 | Slack et al. |
| 6,028,158 A | 2/2000 | Slack et al. |
| 6,433,085 B1 | 8/2002 | Huynh-Ba |
| 6,680,356 B2 | 1/2004 | Huynh-Ba |
| 6,703,452 B2 | 3/2004 | Huynh-Ba |
| 6,780,908 B1 | 8/2004 | Huynh-Ba |
| 7,485,729 B2 | 2/2009 | Hsieh et al. |
| 2005/0038204 A1 | 2/2005 | Walters |
| 2006/0155095 A1 | 7/2006 | Daussin et al. |
| 2007/0299214 A1 * | 12/2007 | Wakabayashi et al. ....... 525/451 |
| 2009/0012258 A1 * | 1/2009 | Shimoma et al. .............. 528/53 |

FOREIGN PATENT DOCUMENTS

| | | |
|---|---|---|
| CN | 101815738 A | 8/2010 |
| EP | 0175344 A2 | 3/1986 |
| EP | 1167412 A1 | 1/2002 |
| JP | 6336573 A | 12/1994 |
| WO | 9427746 A1 | 12/1994 |
| WO | 2004096882 A1 | 11/2004 |
| WO | 2004096883 A1 | 11/2004 |
| WO | 2006029141 A1 | 3/2006 |

OTHER PUBLICATIONS

King Industries, "Preliminary Data Sheet K-KAT XK-614" Product Data Sheet, issue date Oct. 27, 2009.*

* cited by examiner

Primary Examiner — Patrick Niland
(74) Attorney, Agent, or Firm — Andrew E. C. Merriam

(57) ABSTRACT

The present invention provides high solids, two-component polyurethane compositions comprising, as one component, polyisocyanate compositions having one or more isocyanurate made from bis(isocyanatomethyl)-cyclohexane, as a second component, one or more high solids polyol, and in either component, one or more tertiary amine catalyst. Optionally, the compositions further comprise one or more zinc amine catalyst. The compositions provide coatings, which exhibit an excellent balance of pot life and dry to touch or tack free time, as well as early rain resistance and hardness, while enabling a lower volatile organic content (VOC) of the compositions for comparable performance.

9 Claims, No Drawings

POLYURETHANE COATING COMPOSITIONS COMPRISING ISOCYANURATE COMPOSITIONS FROM BIS(ISOCYANATOMETHYL) CYCLOHEXANE AND TERTIARY AMINE CATALYSTS

The present invention relates to two component polyurethanes comprising, as one component, polyisocyanate compositions having one or more isocyanurate and, as a second component, one or more polyol, wherein one of the components contains a tertiary amine catalyst.

There remains the need for low volatile organic compound (VOC) content polyurethane coatings that offer high film hardness and water resistance in a short period of time after coating when cured at ambient or slightly elevated temperatures, and with minimal pot life reductions.

One approach used to improve the initial hardness and water resistance involves replacing a portion of the conventional polyisocyanate crosslinking agent, such as polyisocyanate compositions having one or more isocyanurate from hexamethylene diisocyanate (HDI), with a relatively hard or rigid material, such as polyisocyanate compositions having one or more isocyanurate from isophorone diisocyanate (IPDI). However, polyisocyanates made from or that contain IPDI have a much slower curing rate than that of those made from or containing HDI. Consequently, these coatings must rely on significantly high baking temperatures and/or high levels of conventional organotin catalysts, like dibutyltin dilaurate (DBTDL), to achieve sufficient hardness and water resistance in a relatively short period of time. Further, high baking temperatures are not possible in exterior (field) applications and are undesirable for interior (shop or factory) applications. High tin catalyst levels, on the other hand, produce reduced pot life and, present disposal safety problems and potentially high aquatic toxicity.

Recently, U.S. Pat. No. 6,780,908 B1, to Huynh-Ba, has disclosed polyisocyanate coating compositions comprising, for example, isocyanurates from IPDI and a blend of an acrylic polyol and a polyhydroxyl tertiary amine. The compositions provide a quick cure in making coatings. However, the composition in Huynh-Ba does not provide a meaningful increase in pot life. In addition, the compositions include an organotin catalyst.

The present inventors have endeavored to solve the problem of providing two-component polyurethane compositions that provide coatings with good hardness and water resistance after a short cure time, with a minimal reduction in pot life, while at the same time enabling a coating compositions that are substantially free of organotin catalysts and which require a lower VOC content than known compositions.

STATEMENT OF THE INVENTION

In accordance with the present invention, two-component polyurethane coating compositions are substantially free of organotin catalysts and comprise, as one component, polyisocyanate compositions having one or more isocyanurate made from bis(isocyanatomethyl)cyclohexane, preferably, made from a mixture of a 1,3- and 1,4-bis(isocyanatomethyl) cyclohexane, as a separate component, one or more high solids polyol, preferably, an acrylic polyol or a polyester polyol having two or more primary hydroxyl groups, and, in either or both component, one or more tertiary amine catalyst, preferably a triethylene diamine (TEDA). The compositions may further comprise one or more zinc amine compound to extend pot life, such as an amidine salt.

The high solids of the polyol enhances a lower VOC content. Suitable solids contents of the polyol may range from 60 to 100 wt. %, based on the total weight of polyol and solvent, preferably, 70 wt. % or higher. Accordingly, the compositions of the present invention may have a reduced volatile organic compound (VOC) content of 479.4 g/L or less, preferably, 359.5 g/L or less, or, more preferably, 300 g/L or less.

Suitable tertiary amine catalysts for use in the present invention may include, for example, aliphatic and cyclo-aliphatic tertiary amine catalysts which are mono-, di- or triamines, and mixtures thereof. Such tertiary amine catalysts may be chosen from triethylenediamine, 1,8-Diazabicyclo [5.4.0]-undec-7-ene compounds, such as 6-(Dibutylamino)-1,8-diazabicyclo[5.4.0]undec-7-ene, and other tertiary amine compounds. Amounts of such catalysts may range from 0.1 to 1 wt. % based on total polyisocyanate and polyol solids preferably, 0.2 wt. % or more, or, preferably, up to 0.6 wt. % for triethylenediamine and 1,8-Diazabicyclo[5.4.0]undec-7-ene compounds. For other tertiary amine compounds, such amounts may range from 0.2 to 4.0 wt. % based on total polyisocyanate and polyol solids, preferably, 1.5 wt. % or less. If more than one catalyst is used, amounts of such mixtures may range 0.1 wt. % or more, based on total polyisocyanate and polyol, consistent with the upper limits given for each amine catalyst mentioned above which limits apply independently in all cases.

The polyisocyanate compositions of isocyanurates of bis (isocyanatomethyl)-cyclohexane may optionally be formed from a mixture of geometric isomers of bis(isocyanatomethyl)cyclohexanes, such as, for example, a cis and/or trans 1,3-bis(isocyanatomethyl)cyclohexane, and a cis and/or trans 1,4-bis(isocyanatomethyl)cyclohexane.

In the component having the polyisocyanate, the composition may further comprise one or more polyisocyanate composition having one or more isocyanurate from an aliphatic diisocyanate, preferably, hexamethylene diisocyanate (HDI). The weight ratio of one or more composition of an isocyanurate of bis(isocyanatomethyl)cyclohexane to the one or more composition of an isocyanurate of an aliphatic diisocyanate may range from from 10:90 to 100:0.0, or from 25:75 to 75:25, or, preferably, 40:60 or more.

In addition, the present invention provides coating compositions comprising the two-component polyurethane coating compositions. Such compositions can be pigmented or clear coat compositions.

In another embodiment, the present invention provides coatings made from the coating compositions as well as coated substrates bearing such coatings. The coated substrates may be chosen from plastic, metal and wood articles, such as automotive substrates, structural substrates, machinery and heavy mass parts. In one embodiment, the coatings are multi-layer coatings comprising the polyurethane coatings of the present invention as the topcoat, a base coat, such as a polyester or acrylic coating, e.g. a color coat, and, optionally, a primer coat, e.g. an epoxy.

All ranges are inclusive and combinable. For example, a weight percentage of 0.1 to 1 wt. %, preferably, 0.2 wt. % or more, or, preferably, up to 0.6 wt. % includes ranges of from 0.1 to 0.2 wt. %, from 0.1 to 0.6 wt. %, from 0.2 to 0.6 wt. %, from 0.2 to 1.0 wt. %, or from 0.1 to 1.0 wt. %.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

Unless otherwise specified, all temperature units refer to room temperature (~20-22° C.) and all pressure units refer to standard pressure.

As used herein, unless otherwise indicated, the term "glass transition temperature" or "Tg" refers to the glass transition temperature of a material as determined by Differential Scanning calorimetry (DSC) scanning between −90° C. to 150° C. while heating at a rate of 10° C./min. The Tg is the inflection point of the curve of heat flow vs. temperature or the maximum value on the plot of its derivative.

As used herein, the term "hydroxyl equivalent weight", in the case of acrylic polyols, is calculated by taking the number average molecular weight (Mn) of the polyol by gel permeation chromatography (GPC), and multiplying by the weight fraction of hydroxyl functional monomer used to make the polyol, e.g. hydroxyalkyl(meth)acrylate, based on the total weight of monomers used to make the copolymer, to get a number average hydroxyl weight fraction; then, dividing the resulting number average hydroxyl weight fraction by the mass of such hydroxyl functional monomer that contains a single hydroxyl group.

As used herein, unless otherwise indicated, the term "hydroxyl equivalent weight" of a polyol other than an acrylic polyol, refers to the weight as determined by titration in accordance with ASTM D4274 (2005), wherein the polyol is reacted with phthalic anhydride to form one mole of a carboxyl group for titration, using phenolphthalein indicator in methanol as titrants.

As used herein, the term, "hydroxyl functionality" refers to the average number of hydroxyls per molecule (per polymer chain) and is the number average molecular weight of a polyol divided by its hydroxyl equivalent weight.

As used herein, unless otherwise indicated, the term "Mn" or "number average molecular weight" of a polyol is determined by gel permeation chromatography (GPC).

As used herein, unless otherwise indicated, the term "polyisocyanate" refers to any isocyanate functional molecule having two or more isocyanate groups.

As used herein, the term "substantially free of organotin catalysts" means that a composition contains less than 10 parts per million (ppm), based on total solids or, preferably, less than 1 ppm.

As used herein, unless otherwise indicated, the term "trimer" refers to molecules containing one or more isocyanurate, i.e. triisocyanurate, ring structure; the word "trimer" is synonymous with "isocyanurate". For purposes of this invention, a polyisocyanate containing one isocyanurate ring structure is referred to herein as "IR1". Molecules containing two isocyanurate ring structures are referred to herein as "IR2". In general, unless otherwise noted, compounds of the present invention containing 2 or more isocyanurate rings made from polyisocyanates are referred to as "oligomeric trimers".

The present inventors have found that two-component polyurethane coating compositions having, as one component, a polyisocyanate composition of one or more isocyanurate of bis(isocyanatomethyl)cyclohexane, as the second component, a polyol, and, in either or both components, a tertiary amine catalyst provide coatings having an improved balance of hardness development, early water or rain resistance and pot life while at the same time providing reduced VOC coating compositions. In addition, pot life can be extended further without sacrificing hardness or water resistance by using a zinc amine catalyst in combination with the tertiary amine catalyst.

The compositions of the present invention can be cured at ambient temperatures, or at temperatures ranging from sub ambient (−5° C.) to 150° C., preferably, from ambient conditions to 80° C. Cure temperatures may be varied depending on the substrate, so that heat sensitive plastics can be coated and the coatings cured at 120° C. or less. In addition, coatings applied in the field, such as maintenance coatings and coatings of bridges, heavy machinery and heavy mass parts may be cured at ambient temperatures. Curing times generally range from 30 minutes at elevated temperatures to 1 to 14 days at from 10 to 50° C. Such compositions are especially useful in making clearcoats, such as topcoats for automotive coatings applications and for ambient cure coatings for heavy mass parts or substrates.

The polyisocyanate compositions disclosed herein generally contain isocyanurate group-containing polyisocyanates as well as other polyisocyanates, such as dimers and buirets, as well as the isocyanurates themselves, and dimers and oligomers of any or all of these. As used herein, the term "polyisocyanate composition of an isocyanurate" and "trimer composition" are synonymous.

Suitable mole ratios of the polyisocyanate, which may contain several different trimers, to the polyol may range in known proportions, such as, for example, from 0.7:1:0 to 1.4 to 1.0, or 0.8:1.0 or higher and 1.2:1.0 or lower.

Polyisocyanate compositions of an isocyanurate of a bis (isocyanatomethyl)cyclohexane may be made from a mixture of from 0.1 to 99.9 wt. % of any 1,3-bis(isocyanatomethyl) cyclohexane with from 0.1 to 99.9 wt. % of any 1,4-bis (isocyanatomethyl)cyclohexane, or such mixtures containing 5 wt. % or more of any 1,4-bis(isocyanatomethyl)cyclohexane, or, preferably, 30 to 80 wt. % of any 1,4-bis(isocyanatomethyl)cyclohexane, or, more preferably, 40 wt. % or more, and up to 70 wt. %. In general, polyisocyanate isocyanurate compositions that are made from 1,3-bis(isocyanatomethyl)cyclohexane provide harder, less flexible coatings; whereas the isocyanurate compositions made with 1,4-bis(isocyanatomethyl)-cyclohexanes add flexibility to coatings produced therefrom.

Polyisocyanate compositions of isocyanurates of bis(isocyanatomethyl)-cyclohexane may be prepared by methods known in the art, for example, as disclosed in U.S. patent publication no. 2006/0155095A1, to Daussin et al., by trimerizing (i) 1,3-bis(isocyanotomethyl)cyclohexane or 1,4-bis-(isocyanotomethyl)cyclohexane or (ii) an isomeric mixture of two or more isocyanates chosen from cis-1,3-bis(isocyanotomethyl)cyclohexane, trans-1,3-bis(isocyanotomethyl)cyclohexane, cis-1,4-bis(isocyanotomethyl)-cyclohexane and trans-1,4-bis(isocyanotomethyl)cyclohexane in the presence of one or more trimerization catalyst, such as, for example, a tertiary amine or phosphine or a heterogeneous catalyst, and, if desired, in the presence of solvents and/or assistants, such as co-catalysts, expediently at elevated temperature, until the desired NCO content has been reached, and then deactivating the catalyst using inorganic and organic acids, the corresponding acid-halides and alkylating agents and, preferably, heating. The polyisocyanate isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified to contain urethane, urea, biuret, allophanate, imino-s-triazine, uretonimine or carbodiimide moieties.

Suitable bis(isocyanatomethyl)cyclohexane raw materials may be manufactured in a known manner from, for example, the Diels-Alder reaction of butadiene and acrylonitrile, subsequent hydroformylation, then reductive amination to form the amine, cis-1,3-bis(aminomethyl)cyclohexane, trans-1,3-bis(aminomethyl)cyclohexane, cis-1,4-bis(aminomethyl)cyclohexane and trans-1,4-bis(aminomethyl)cyclohexane, followed by reaction with phosgene to form a cycloaliphatic diisocyanate mixture. The preparation of the bis(aminomethyl)cyclohexane is described, for example, in U.S. Pat. No. 6,252,121, to Argyropoulos et al.

Any two or more bis(isocyanatomethyl)cyclohexanes, or one or more of these with one or more aliphatic diisocyanate may be mixed prior to the trimerization step, or the trimer containing polyisocyanate mixtures of the individual diisocyanates may be formed and then blended together. For example, trimer containing mixtures of 1,3- and 1,4-isomers of bis(isocyanatomethyl)cyclohexane may be separately produced and the products mixed, or each of one or more 1,3- and one or more 1,4-isomer thereof can be present together before the trimerization step. In a similar manner, the polyisocyanate isocyanurate compositions containing aliphatic diisocyanates can be produced by having these diisocyanates present prior to trimerization or produced separately and blended in with the polyisocyanate isocyanurate compositions produced from one or more bis(isocyanatomethyl)-cyclohexane isomers.

Suitable aliphatic diisocyanate compositions for making isocyanurate compositions of such diisocyanates to be used in minor amounts of the polyisocyanate component of the present invention may include, for example, C2-C8 alkylene diisocyanates, such as tetramethylene diisocyanate and hexamethylene diisocyanate (HDI).

Generally, the trimerization reaction is carried out until the unreacted monomer content is 80 wt. % or less, based on the total weight of monomer raw materials, preferably 70 wt. % or less, or 65 wt. % or less, for example, from 20 to 40 wt. %. Preferably, the composition of an isocyanurate of bis(isocyanatomethyl) cyclohexane contains an IR1 content of 30 wt. % or less, based on the weight of the total composition, more preferably, 40 wt. % or less and, most preferably, 50 wt. % or less.

The production of the polyisocyanate isocyanurate compositions of the present invention preferably is carried out in the absence of an organic solvent.

In another aspect, the polyisocyanate compositions of isocyanurates in the present invention may be modified, for example, as disclosed in U.S. patent publication no. 2006/0155095A1, to Daussin et al., by the addition of a compound containing one or more groups reactive to isocyanate, such as a hydroxyl or primary or secondary amine group. Such modified polyisocyanate compositions may comprise the reaction of one or more bis(isocyanotomethyl)cyclohexane and/or aliphatic diisocyanate with one or more monol, such as a C1 to C8 monol or an alkyloxypolyalkylene glycol, diol, diamine, monoamine, or aminoalcohol and a trimerization catalyst in situ resulting in an alkane, polyalkylene oxide, polyester or polytetramethylene oxide modified polyisocyanate composition, Where the polyisocyanate compositions are modified by a monol or other compound containing one group reactive to isocyanates, partially or fully blocked isocyanates or isocyanurates are formed and these may be activated by heating to deblock. Typical blocking groups are caprolactam, the oxime of methyl ethyl ketone, phenol and phenolic compounds, imidazole and pyrazole.

The modified trimer can be further modified by various procedures known to those skilled in the art. One such modification is to incorporate allophanate or biuret linkages, which further increases the molecular weight of the final product. The allophanate or biuret extended trimers can be prepared, for example, as disclosed in U.S. patent publication no. 2006/0155095A1, to Daussin et al., by heating the modified trimers under agitation to elevated temperatures. If desired, a catalyst which promotes allophanate or biuret formation can be added.

Alternatively, a polyisocyanate prepolymer composition formed by reaction of bis(isocyanotomethyl)cyclohexane and/or aliphatic diisocyanate with a monol, diol, diamine, or monoamine, can be modified by the reaction of additional isocyanate to form allophanate or biuret modified prepolymers which can then be mixed with a trimerization catalyst giving an allophanate or biuret modified polyisocyanate isocyanurate composition. Preparation of such allophanate or biuret prepolymers, followed by trimerization, is known in the art, see for example, U.S. Pat. Nos. 5,663,272 and 6,028,158.

Two isocyanurate-ring ureas can be formed by reaction of the isocyanurate with water, the resulting ureas can be converted via reaction with residual isocyanate to form buirets.

In accordance with the present invention, suitable polyols may comprise acrylic polyols and polyester polyols. Such suitable polyols, may include, for example, hydroxyl functional acrylic addition polymers, polyester polyols, polyester polyols from caprolactone, polyester/polyether hybrid polyols; and polyesteramide polyols.

To enable better reactivity and faster cure, the hydroxyl functionality of a polyol according to the present invention may range from 2.5 to 5.0, or, up to 4.5, or, preferably, 2.9 or more, or, preferably 3.0 or higher, or, preferably, up to 4.0. The hydroxyl functionality of the polyol should be low enough to insure lower viscosity, thereby enabling one to lower the VOC of the compositions of the present invention, while at the same time being high enough to insure that coatings and products formed from the compositions have adequate solvent resistance and other properties, such as good hardness.

Suitable acrylic polyols may include any acrylic polyol in an organic solvent, including those formed by conventional means, such as, for example, organic solvent solution polymerization each in the presence of a free radical initiator, e.g. a peracid or its salt, or formed by aqueous polymerization and subsequent dissolution in organic solvent. In such polyols, the hydroxyl functionality may be provided by hydroxyl functional vinyl or acrylic monomers, such as hydroxyethyl methacrylate (HEMA) or allyl alcohol.

Suitable acrylic polyols may have a glass transition temperature (Tg) of −20° C. or more, or 0° C. or more, or, preferably, 10° C. or more, or 30° C. or less, or up to 70° C. If the Tg of the acrylic polyol is too high, then suitable compositions require excessive solvent for workability.

Other suitable polyols may be aromatic group containing polyesters, polyesteramides, or polycarbonates having a glass transition temperature (Tg) of 0° C. or above and a hydroxyl functionality of from, 2.5 to 5.0. Such polyols may be formed in a conventional manner via bulk polymerization of diacid and an excess of diol using at least some aromatic reactants, e.g. terephthalic acid.

Still other useful polyester polyols comprise any having a Tg of 0° C. or lower and a hydroxyl functionality of 2.5 to 5.0. Such polyols may be made by conventional means, such as by bulk polymerization to form polyester-(amide)s, e.g. from diacids or difunctional anhydrides or their salts with hydroxyl containing reactants, poly(thio)ethers, polyacetals, polycarbonates or polylactones or by reacting oligomeric or polymeric polyols or polyethers, e.g. polyoxyalkylenes, or reactive hydrogen containing polyol oligomers in the presence of carboxyl, lactone, esteramide or carbonate containing reactants.

No matter their glass transition temperature, suitable polyester polyols having a hydroxyl functionality of 2.5 to 5.0 can be formed by methods known in the art, such as by polymerization or reaction, e.g. endcapping, in the presence small amounts, e.g. 0.1 to 4.0 wt. %, based on the weight of all reactants used to make the polyol, of triols or higher hydroxyl functional reactants, e.g. glycerol or trimethylolpropane, or, if the intermediate compounds are amine, hydroxyl or thiol functional, reaction in the presence of small amounts of tri- or higher acid functional carboxylic acids, e.g. citric acid, to form branched polymers which are then reacted with, for example, an excess of diols to insure hydroxyl functional end groups.

In another aspect of polyester polyols according to the present invention, the polyester polyol may be an oil based polyol, for example, a seed oil based polyol, having a non-reactive, hydrophobic pendant group, such as a 4 to 36 carbon alkyl group, preferably 6 carbons or more. Such oil based soft polyols may have a hydroxyl functionality of 2.5 or higher, may be made by methods known in the art from natural or synthetic animal and/or vegetable oils, fats, fatty acids or fatty glycerides, such as soy and castor oils. Such methods, for example, are as disclosed in PCT publication Nos. WO 2004/096882 and 2004/096883. Preferred are vegetable (seed) oils that have at least about 70 percent unsaturated fatty acids in the triglyceride such as soy, canola or sunflower oils. Several chemistries can be used to prepare such oil based polyols, including modifications by, but not limited to, for example, epoxidation, hydroxylation, ozonolysis, esterification, hydroformylation, or alkoxylation. Such modifications are commonly known in the art. For example, one such method comprises transesterifying fatty acids or fatty glycerides, with a suitable alcohol, such as methanol, to form fatty acid alkyl esters, followed by reductive hydroformylation of carbon-carbon double bonds in the constituent fatty acids esters to form hydroxymethyl groups, and then forming a polyester polyol or polyether/polyester by reacting the hydroxymethylated fatty acid esters with an initiator compound which is a polyol, such as a diol or triol, or polyamine. In this process, polyol molecular weight advances both by condensation of the monomers with the glycol initiator and by self condensation of the hydroformylated fatty acids esters. By controlling average functionality of the hydroformylated fatty acids esters and their ratio to the glycol initiator, both polyol molecular weight and average functionality can be systematically controlled.

Suitable initiators may include, for example, glycols having from 2 to 36 carbon atoms, such as, for example, ethylene glycol and 1,2-propylene glycol; diamines, such as ethylene diamine; triols, such as, for example, glycerol, 1,2,6-hexanetriol and trimethylolpropane; and others, such as, for example, pentaerythritol, sucrose, sorbitol, and diethylene triamine; and mixtures thereof. Exemplary initiators may contain reactive primary hydroxyl groups, such as 1,6-hexanediol and UNOXOL™ Diol. UNOXOL™ Diol is a liquid cycloaliphatic diol that is an approximately 50:50 mixture of 1,3-cyclohexanedimethanol and 1,4-cyclohexanedimethanol, which is a mixture of cis and trans isomers.

Suitable initiators may be alkoxylated with ethylene oxide or a mixture of ethylene oxide and at least one other alkylene oxide to give an alkoxylated initiator.

As used herein, the term "pendant group" refers to an alkyl functional group that is extended from the backbone of an oil based polyol, and does not contain any reactive groups, e.g. one or more hydroxyl groups. The pendant groups are free to associate with each other once the inventive coating is generated. Preferably, the pendant groups are 6 to 36 carbon alkyl groups.

The molecular weight of a suitable polyester polyol according to the present invention may range from 500 to 5,000 preferably, 1,000 or more, or, preferably, 2,000 or less. Controlling the molecular weight of the polyester polyols enables better control of composition viscosity.

In accordance with the present invention, adding one or more tertiary amine catalyst to the two-component polyurethane compositions of the present invention enables one to avoid use of an organotin catalyst while providing rapid ambient or low temperature curing and maintaining good pot life in compositions having a lower VOC content than current compositions having comparable properties. Such tertiary amine catalysts may include, for example, aliphatic and cyclo-aliphatic tertiary amine catalysts which are mono-, di-, or tri-amines, and may include for example, including imidazole compounds, 1,8-diazabicyclo[5.4.0]undec-7-ene and its derivatives.

The amount of the one or more tertiary amine catalyst is selected so as to improve the pot-life, dry speed balance, achieve faster hardness development and early water or rain resistance. Preferred amounts of such catalysts enable greater formulation flexibility without impairing the desired coating properties.

Pot life can be further improved by including a zinc amine catalyst, such as (K-Kat XK-614) available from King Industries, Inc (Norwalk, Conn.), or a metal amine catalyst, such as lithium, magnesium or barium amines or amidines. Suitable amounts of such a catalyst may range from 0.1 to 2.5 wt. %, based on the total polyisocyanate and polyol solids, preferably 0.2 to 1.0 wt. %.

The two-component polyurethane coating compositions of the present invention may further comprise conventional additives such as, for example, colorants, pigments and fillers, light stabilizers, UV absorbing compounds, flow aids, wetting and dispersing additives, defoamers, rheology modifiers.

Coatings according to the present invention may be applied to a desired substrate by conventional means. Such coatings can be cured at ambient temperatures, or at temperatures ranging from −5 to 150° C., preferably ambient conditions to 80° C. Cure temperatures may be varied depending on the substrate, so that heat sensitive plastics can be coated and the coatings cured at 120° C. or less. In addition, coatings applied in the field, such as maintenance coatings and coatings of bridges, heavy machinery and heavy mass parts may be cured at ambient temperatures. Curing times generally range from 30 minutes (at elevated temperatures) to 1 to 14 days.

The two-component polyurethane compositions of the present invention are particularly useful for producing paints and varnishes, and coatings. The compositions of the present invention are particularly suited for top coats. End-use applications include, but are not limited to, furniture such as tables, cabinets; building materials such as wood floors, pipes; appliances such as refrigerator handles; automotive exterior parts, and interior parts, and consumer products such as cellphones, bags, and plastic casings.

The present invention further provides polyurethane coatings made from the two-component polyurethane coating compositions on any of the substrates mentioned above. Such coatings can be multilayer coatings over a primer layer and, optionally, a basecoat or color coat.

Coatings in accordance with the present invention may have any or all of a König hardness measured in accordance with ASTM-D 4366 of 70 seconds, or greater, preferably 100 seconds, or greater,

EXAMPLES

The following examples are provided to illustrate the present invention. The test methods used in the examples are described, as follows:

Film thickness of the coatings was determined using coating thickness gage (Positector® 6000, Paul N. Gardner Company, Inc.).

Pot Life is defined as the time it takes for the viscosity of the coating material to increase to twice its initial viscosity. Viscosity was measured in centipoise at 25° C. using a Brookfield CAP 1000 Viscometer and a CAP-03 spindle. An acceptable pot life is greater than or equal to 1 hour, preferably greater than or equal to 2 hours.

Dry to Touch and Tack Free Time was determined by applying the coating composition to an aluminum panel with a drawdown bar having a 177.8 micron (7 mil) opening and allowing it to dry for a set time before testing. To test, a Zapon Tack Tester (Atlas Powder Company, Stamford, Conn., as described in U.S. Pat. No. 2,406,989 was placed on the film and a 5 gram weight was placed on the center of the base portion of the tester. After waiting 5 seconds, the weight was removed. Dry to Touch is achieved when the base portion of the tester pulls away from the film surface in less than 5 seconds after removing the 5 gram weight. An acceptable Dry to Touch time is less than or equal to 4 hours, preferably less than or equal to 3 hours. Tack Free Time is determined in a similar manner, except using a 100 gram weight An acceptable Tack Free Time is less than or equal to 8 hours, preferably less than or equal to 5 hours.

Early Rain Resistance was determined by applying the coating composition to an aluminum panel with a drawdown bar having a 177.8 micron (7 mil) opening. After allowing the coating to dry for 6 hours or 24 hours, as indicated, at room temperature, the panels were placed in a fogbox chamber, exposed to a water spray mist for 16 hours. After the misted coating was dry, the 60° or 20° gloss, as indicated, was measured and compared to the corresponding 60° or 20° gloss of the same coating allowed to dry for the same time period and not exposed to the water mist. An acceptable % 60° gloss loss for 6 hour dry is less than or equal to 20%, preferably less than or equal to 10%. and for 24 hour dry, an acceptable % 20° gloss loss is less than or equal to 20%, preferably less than or equal to 10%.

König or Pendulum hardness of the coating films was determined after the dry time indicated according to ASTM-D 4366 (1995) by using a pendulum hardness tester and is reported in seconds. König hardness in the range of an acceptable hardness level for a coating is 70 seconds or more, preferably, 100 seconds or more.

Synthesis Example 1

Trimer 1 or T1

To make Trimer 1, a 1.8 L hastelloy reactor equipped with a gas bubbler, mechanical stirrer, thermometer and condenser are added 1600 grams of a 1:1 w/w mix of 1,3 bis(isocyanatomethyl)-cyclohexane and 1,4 bis-(isocyanatomethyl) cyclohexane containing a mixture of cis- and trans-isomers of each compound. Dry nitrogen is bubbled through the stirred reaction mixture while it is heated at 70° C. For example 35, 1.9 grams of a 75 percent solution of quaternary ammonium carboxylate in ethyleneglycol are added to the reaction mixture. The reaction temperature is maintained between 70 and 75° C. When the reaction mixture reaches an NCO content of 30 percent, the reaction is stopped by adding 0.5 g of chloroacetic acid. The excess monomer is separated in a short path distillation unit to provide a clear product. The resulting trimer containing composition is dissolved in butylacetate to obtain a product containing 30 wt percent butylacetate, an NCO equivalent weight of 347 and a free monomer content of less than 0.5 wt percent. Analysis of the oligomer distribution indicates the product contains 48 percent IR1, 22 percent IR2 and 30 percent higher MW polyisocyanates, including trimer oligomers.

The following Table 1 presents a list of materials used in the Examples according to their abbreviation or convention used in the tables that follow.

TABLE 1

Materials Used in the Examples

| Material/Name | Notes |
|---|---|
| Acrylic Polyol 1 | Solution polymerized single stage acrylic polyol; OH number = 140; Molecular weight = 5000; Tg = 20° C.; 80 wt. % solids |
| Acrylic Polyol 2 | Solution polymerized single stage acrylic polyol; OH number = 71; Molecular weight = 10,000; Tg = 20° C.; 80 wt. % |
| Triethylene Diamine, 8% in PMAc | DABCO ™ Air Products and Chemicals (Allentown, PA) |
| TEDA | Triethylene diamine |
| PMA | Pentamethyldipropylenetriamine |
| DMCHA | Dimethyl cyclohexyl amine |
| DBU | 1,8-Diazabicyclo[5.4.0]undec-7-ene |
| Bu2N-DBU | 6-(Dibutylamino)-1,8-diazabicyclo[5.4.0]undec-7-ene |
| TMHD | Tetramethyl n-hexyl diamine |
| K-Kat ™ | Zinc amine compound |
| XK-614 | King Industries, Inc (Norwalk, CT) |
| Dibutyltin Dilaurate (DBTDL) 1% in n-BuAc | DABCO ™ T-12 Air Products and Chemicals (Allentown, PA) |
| Flow Aids | Byk 333 and Byk 300, Byk USA, Inc. (Wallingford, CT) |
| Pigment Dispersing Aid | Disperbyk ™ 163, Byk USA, Inc. (Wallingford, CT) |
| Defoamer | Tego Airex ™ 980, Evonik Industries (Hopewell, VA) |
| Anti-Silk aid | Raybo ™ 3, Raybo Chemical Co. (Huntington, WV) |
| Hindered amine light stabilizer | Tinuvin ™ 292, Ciba Specialty Chemicals Corp. (Tarrytown, NY) |
| UV absorber | Tinuvin ™ 1130, Ciba Specialty Chemicals Corp. (Tarrytown, NY) |
| Green Pigment Dispersion | UCD 5105HS Phthalocyanine green solvent dispersion Plasticolors (Ashtabula, OH) |
| White Pigment Dispersion | UCD 1106HS TiO₂ solvent dispersion Plasticolors (Ashtabula, OH) |
| n-BuAc | n-Butyl Acetate |
| PMAc | Propylene glycol monomethyl ether acetate |
| HDI Trimer | Desmodur ™ N 3300A Trimer of hexamethylene diisocyanate (HDI) Bayer Material Sciences (Pittsburgh, PA); NCO equivalent weight 193; 100% solids |
| Trimer 1 or T1 | See Synthesis Example 1 |
| Trimer 2 or T2 | Tolonate ™ IDT 70B Trimer from isophorone diisocyana (IPDI) (Perstorp, Cranbury, NJ) |
| TiO₂ (Rutile) | TiPure ™ R-960 (DuPont, Wilmington, DE) |

To make the formulations in Table 2A, below, the materials A listed in the table were mixed with an equal weight of sand and then stirred at a high speed for 25 minutes. The resultant mixture was filtered through paint strainers (medium mesh, ST-9011 from Paul N. Gardner Company, Inc) and the filtrate was collected. Such step was repeated until desired amount of titanium dioxide dispersion was obtained. The materials B listed in Table 2A were mixed by vigorous shaking by hand for 30 seconds, and then added to the titanium dioxide dispersion. Then, the remaining materials were added by simple mixing. The resulting coatings were drawn down on a chromate treated aluminum panel with a wet film applicator with a 7 mil (178 micron) gate clearance to give an average dry coating thickness of 63 microns and were dried at room temperature.

imparts the best balance of fast Dry to Touch with long Pot Life while maintaining or slightly improving Early Rain Resistance and Hardness development vs Comparative Example B. There is a significant dry speed/pot life balance advantage for tertiary amine catalysts as in Example 2 vs organotin catalysts (DBTDL) in Comparative Example C when using a 50/50 blend of ADI/HDI. The tertiary amine catalysts provide greatly extended pot life and shorter Dry to Touch time, respectively, in coatings of Examples 1 and 2 than the DBTDL catalyst in corresponding Comparative Examples B and C. In addition, the same coatings with Trimer 1 provide coatings in Examples 1 and 2 with longer pot life and shorter Dry to Touch times than the corresponding coatings with a 25/75 (w/w) IPDI/HDI blend in Comparative Example A. Finally, all coatings with organotin catalysts in Tables 2A[1] and 2B: White Formulations With Tertiary Amine Catalyst and Zinc Amine Catalyst

| Example | | 1 | 2 | *A | *B | *C | *D |
|---|---|---|---|---|---|---|---|
| Acrylic Polyol 2 | A | 13.3 (10.6) | 13.3 (10.6) | 13.3 (10.6) | 13.3 (10.6) | 13.3 (10.6) | 13.3 (10.6) |
| TiO$_2$ (Rutile) | | 30 (30) | 30 (30) | 30 (30) | 30 (30) | 30 (30) | 30 (30) |
| PMAc | | 8.3 | 8.3 | 8.3 | 8.3 | 8.3 | 8.3 |
| Disperbyk 163 | | 0.6 | 0.6 | 0.6 | 0.6 | 0.6 | 0.6 |
| Defoamer | | 0.25 | 0.25 | 0.25 | 0.25 | 0.25 | 0.25 |
| Acrylic Polyol 2 | B | 24.7 (19.8) | 25.7 (20.6) | 26.1 (20.9) | 24.7 (19.8) | 25.7 (20.6) | 26.1 (20.9) |
| TEDA (8% in PMAc) | | 1.0 | 1.0 | 1.0 | 0 | 0 | 0 |
| DBTDL (1% in n-BuAc) | | 0 | 0 | 0 | 0.8 | 0.8 | 0.8 |
| K-KAT XK-614 (10% in n-BuAc) | | 2.0 | 2.0 | 2.0 | 0 | 0 | 0 |
| n-BuAc | | 4.3 | 4.3 | 4.3 | 4.3 | 4.3 | 4.3 |
| BYK 300 Flow aid | | 0.35 | 0.35 | 0.35 | 0.35 | 0.35 | 0.35 |
| Anti-silk aid | | 0.07 | 0.07 | 0.07 | 0.07 | 0.07 | 0.07 |
| Hindered amine light stabilizer | | 0.4 | 0.4 | 0.4 | 0.4 | 0.4 | 0.4 |
| UV absorber | | 0.4 | 0.4 | 0.4 | 0.4 | 0.4 | 0.4 |
| Trimer 1 | | 13.5 (9.6) | 6.2 (4.4) | 0 | 13.5 (9.6) | 6.2 (4.4) | 0 |
| HDI Trimer | | 0 | 4.4 (4.4) | 6.3 (6.3) | 0 | 4.4 (4.4) | 6.3 (6.3) |
| Trimer 2 | | 0 | 0 | 3.1 (2.1) | 0 | 0 | 3.1 (2.1) |
| n-BuAc | | 0.9 | 2.7 | 3.6 | 3.1 | 4.9 | 5.8 |
| TOTAL grams (solid grams) | | 100 (70) | 100 (70) | 100 (70) | 100 (70) | 100 (70) | 100 (70) |

[1] All materials in grams (g) and amounts in paren are g solid.

TABLE 2B

Coating Test Results from Table 2A

| Example | 1 | 2 | *A | *B | *C | *D |
|---|---|---|---|---|---|---|
| Catalyst[1] | 0.2% TEDA + 0.5% XK-614 | | | 0.02% DBTDL | | |
| Trimers | 100% Trimer 1 | 50/50 T1/HDI | 25/75 IPDI/HDI | 100% Trimer 1 | 50/50 T1/HDI | 25/75 IPDI/HDI |
| Coating Properties | | | | | | |
| Pot Life (hrs) | 5.2 | 5 | 4.6 | 2.5 | 1.6 | 1.8 |
| Dry to Touch (hrs) | 1.75 | 3 | 3.5 | 3 | 3.5 | 2.5 |
| Early (24 hr) Rain Resistance (20° Gloss before/after rain) | 92/81.5 | 91.5/90 | 91/89 | 91/66 | 92/91.5 | 91/88 |
| Pendulum Hardness (1 day/2 wk dry) (Konig seconds) | 21.0/105 | 21.0/78.4 | 19.6/72.8 | 18.2/96.6 | 15.4/71.4 | 14.0/58.8 |

*Indicates Comparative Example;
[1]Amounts given are solids wt. %, based on total polyol and polyisocyanate solids.

As shown in Table 2B, above, using the inventive blend of tertiary amine and zinc amine catalysts with 100% of Trimer 1 from bis(isocyanatomethyl)-cyclohexane in Example 1 Comparative Examples B, C and D provide vastly inferior pot life and lower Pendulum hardness than the coatings with the inventive catalyst blend.

TABLE 3[1]

Clear coating formulations at 0.5 wt. % Solids of Tertiary Amine Catalyst

| Example | 3 | Comparative E | Comparative F | Comparative G | Comparative H |
|---|---|---|---|---|---|
| Acrylic polyol 1 | 50.00 (40.00) | 50.14 (40.11) | 53.75 (43.00) | 53.92 (43.14) | 53.90 (43.12) |
| Trimer 1 | 35.01 (24.79) | 35.11 (24.86) | — | — | — |
| HDI trimer | — | — | 21.79 | 21.84 (21.84) | 21.85 (21.85) |
| TEDA (8% inPMAc) | 4.07 | — | 4.05 | — | — |
| DBTDL (1% n n-BuAc) | — | 1.32 | — | 1.31 | 3.26 |
| n-BuAc | 5.94 | 4.68 | 15.42 | 14.18 | 12.23 |
| PMAc | 4.98 | 8.76 | 4.98 | 8.75 | 8.76 |
| Total grams (solid grams) | 100 (64.8) | 100 (65) | 100 (64.8) | 100 (65) | 100 (65) |

[1]All materials in grams (g) and amounts in paren are g solid.

TABLE 4

Clear Coating Properties

| Example | 3 | Comparative E | Comparative F | Comparative G | Comparative H |
|---|---|---|---|---|---|
| Catalyst | 0.50% TEDA | 0.02% DBTDL | 0.50% TEDA | 0.02% DBTDL | 0.05% DBTDL |
| Trimers | T1 | T1 | HDI Trimer | HDI Trimer | HDI Trimer |
| Coating Properties | | | | | |
| Pot Life (hrs) | 1.7 | 0.9 | 1.7 | 0.7 | 0.2 |
| Dry to Touch (hrs) | 1.4 | 2.1 | 4.4 | 6.5 | 1.75 |
| 1 day Pendulum hardness (Konig seconds) | 82.06 | 43.4 | 56.0 | 39.2 | 26.6 |
| 14 days Pendulum Hardness (König seconds) | 131.6 | 133.0 | 63.0 | 107.8 | 58.8 |

1. Wt % solids based on total polyol and polyisocyanate solids.

The formulations in Table 3, above, were mixed by simple mixing using a Benchtop air-powered mixer. The resulting coatings were drawn down on a chromate treated aluminum panel with a wet film applicator with a 7 mil (178 micron) gate clearance to give an average dry coating thickness of 58 microns and were dried at room temperature.

As shown in Table 4, below, clear polyurethane coating formulations using triethylene diamine (TEDA) as a catalyst for an inventive clear coating of Trimer 1 in Example 3 provides a hard coating with a desirable combination of shorter dry to touch times/longer pot life and better hardness development than when using DBTDL catalyst in Comparative Example E. Clear urethane coatings based on the HDI trimer and using the TEDA catalyst in Comparative Example F provide similar pot life to the coating of Example 3, but much longer dry to touch times and softer films. As shown in Comparative Examples G and H, the desirable balance of pot life, dry speed and hardness achieved with the combination of TEDA and Trimer 1 cannot be achieved by combining DBDTL catalyst with the HDI trimer.

TABLE 5[1]

Deeptone Green Coating Formulations

| Example | 4 | 5 | 6 | Comparative I |
|---|---|---|---|---|
| Acrylic Polyol 1 | 42.41 (33.93) | 42.19 (33.75) | 42.92 (34.33) | 43.21 (34.57) |
| Trimer 1 | 32.79 (23.21) | 32.62 (23.09) | 33.20 (23.50) | 33.40 (23.64) |
| TEDA (8% in PMAc) | 1.90 | 3.77 | — | — |
| DBTDL (1% in n-BuAc) | — | — | — | 1.23 |
| K-kat XK-614 | — | — | 0.62 | — |
| UCD 5150HS Green pigment dispersion | 8.73 | 8.71 | 8.90 | 8.89 |
| UCD 1106HS white pigment dispersion | 1.77 | 1.76 | 1.81 | 1.80 |
| BYK 333 Flow aid | 0.16 | 0.16 | 0.16 | 0.16 |
| Raybo 3 Anti-silk aid | 0.03 | 0.03 | 0.03 | 0.03 |
| Tinuvin ™ 292 hindered amine light stabilizer | 0.79 | 0.78 | 0.79 | 0.80 |
| Tinuvin ™ 1130 UV absorber | 0.79 | 0.78 | 0.79 | 0.80 |
| n-BuAc | 7.50 | 7.65 | 6.01 | 4.88 |
| PMAc | 3.13 | 1.55 | 4.77 | 4.80 |
| Total grams (solid grams) | 100 (66.4) | 100 (66.2) | 100 (67.7) | 100 (67.4) |

[1]All materials in grams (g) and amounts in paren are g solid.

The formulations in Table 5, above, were mixed by simple mixing using a Benchtop air-powered mixer. The resulting coatings were drawn down on a chromate treated aluminum panel with a wet film applicator with a 7 mil (178 micron) gate clearance to give an average dry coating thickness of 61 microns and were dried at room temperature.

As shown in Table 6, below, a lower level (0.25 wt % solids, based on total polyol and polyisocyanate solids) of TEDA in a deeptone green urethane coating made from Trimer 1 in Example 4 provides improved pot life and tack free time than the corresponding amount of 0.02 wt. % solids of organotin catalyst (DBTDL) in Comparative Example I with similar hardness, but there is more gloss loss after an early simulated rain. Increasing the TEDA level to 0.5 wt. % solids, based on total polyol and polyisocyanate solids, in Example 5 provides improved early rain resistance in addition to improved pot life, tack free time vs the standard DBTDL catalyst in Comparative Example I. A zinc amine catalyst in Example 6 also provides excellent early water resistance, improved pot life and tack free time.

TABLE 6

| | Deeptone Green Coating Properties | | | |
|---|---|---|---|---|
| Example | 4 | 5 | 6 | Comparative I |
| Catalyst[1] | 0.25% TEDA | 0.50% TEDA | 1.0% zinc amine | 0.02% DBTDL |
| | | Coating Properties | | |
| Pot Life (hrs) | 2.5 | 1.7 | 1.75 | 1.1 |
| Tack Free Time (hrs) | 7 | 4.5 | 6.1 | >8.5 |
| 6 hr Early Rain Resistance (60° Gloss before/after rain) | 95.6/22.9 | 95.6/94.2 | 95.5/93.7 | 95.6/78.6 |
| Pendulum Hardness (König seconds) 1 day/14 days | 96.6/163.8 | 95.2/140.0 | 72.8/137.2 | 53.2/168.0 |

[1] Wt % solids based on total polyol and polyisocyanate solids.

The formulations in Table 7, below, were mixed by simple mixing using a benchtop air-powered mixer. The resulting coatings were drawn down on a chromate treated aluminum panel with a wet film applicator with a 7 mil (178 micron) gate clearance to give an average coating thickness of 58 micron and were dried at room temperature.

As shown below, Tables 7 and 8 provide, respectively, formulations and properties of polyurethane coatings where different levels of TEDA are used as catalysts. These formulations all have very high solids contents of 65%. In Examples 7 and 8, using increased amount of TEDA as catalyst for clear urethane coatings made from Trimer 1 further enhances the dry speed of ambient cure urethane coatings and provides a coating with excellent König pendulum hardness. However, in Comparative Examples J and K, the increased amount of TEDA used in clear urethane coatings made from HDI trimer improves the dry speed but results in a coating with much less König Pendulum hardness and a greatly extended tack free time.

TABLE 7[1]

| | Clear Coating Formulations with Variable Catalyst Proportions | | | |
|---|---|---|---|---|
| Example | 5 | 6 | Comparative J | Comparative K |
| Acrylic Polyol 1 | 50.08 (40.06) | 50.00 (40.00) | 53.84 (43.07) | 53.75 (43.00) |
| Trimer 1 | 35.06 (24.83) | 35.01 (24.79) | — | — |
| HDI trimer | — | — | 21.83 (21.83) | 21.79 (21.79) |
| TEDA (8% in PMAc) | 2.04 | 4.07 | 2.03 | 4.05 |
| n-BuAc | 5.95 | 5.94 | 15.44 | 15.42 |
| PMAc | 6.87 | 4.98 | 6.86 | 4.98 |
| Total grams (solid grams) | 100 (64.9) | 100 (64.8) | 100 (64.9) | 100 (64.8) |

[1] All materials in grams (g) and amounts in paren are g solid.

TABLE 8

Clear Coating Properties

| Example | 5 | 6 | Comparative J | Comparative K |
|---|---|---|---|---|
| Catalyst | 0.25% TEDA | 0.50% TEDA | 0.25% TEDA | 0.50% TEDA |
| Coating Properties | | | | |
| Pot Life (hrs) | 3.1 | 1.7 | 3.6 | 1.7 |
| Dry to touch time (hrs) | 2 | 1.4 | 7.5 | 4.4 |
| Tack free time (hrs) | 4.5 | 2.9 | >8.5 | >8 |
| 14 days Pendulum Hardness (König seconds) | 137.2 | 131.6 | 112.0 | 63.0 |

TABLE 9[4]

Clear Coatings Formulations With Various Tertiary Amines

| Example | 7 | 8 | 9 | 10 | 11 | 12 | Comparative L |
|---|---|---|---|---|---|---|---|
| Acrylic polyol 1 | 46.21 (36.97) | 46.06 (36.85) | 46.12 (36.89) | 46.06 (36.85) | 46.18 (36.94) | 46.18 (36.94) | 46.33 (37.07) |
| Trimer 1 | 32.29 (22.86) | 32.21 (22.80) | 32.25 (22.83) | 32.21 (22.80) | 32.29 (22.86) | 32.29 (22.86) | 32.40 (22.94) |
| DBTDL[3] | — | — | — | — | — | — | 1.20 |
| TEDA[2] | 3.74 | — | — | — | — | — | — |
| DMCHA[1] | — | 5.96 | — | — | — | — | — |
| PMA[1] | — | — | 4.51 | — | — | — | — |
| TMHD[1] | — | — | — | 5.96 | — | — | — |
| DBU[1] | — | — | — | — | 2.99 | — | — |
| Bu2N-DBU[1] | — | — | — | — | — | 2.99 | — |
| n-BuAc | 11.23 | 7.82 | 9.16 | 7.82 | 10.56 | 10.56 | 12.07 |
| PMAc | 6.54 | 7.95 | 7.96 | 7.95 | 7.97 | 7.97 | 8.00 |

[1]10% in n-butyl acetate;
[2]2.8% in PMAc;
[3]1% in n-BuAc;
[4]All materials in grams (g) and amounts in paren are g solid.

TABLE 10

Clear Coating Properties from Formulations of Table 9

| Example | 7 | 8 | 9 | 10 | 11 | 12 | Comparative L |
|---|---|---|---|---|---|---|---|
| Catalyst[1] | 0.5% TEDA | 1% DMCHA | 0.75% PMA | 1% TMHD | 0.5% DBU | 0.5% Bu2N-DBU | 0.02% DBTDL |
| Coating Properties | | | | | | | |
| Pot Life (hrs) | 2.6 | 3.1 | 4.3 | 3.5 | 1.1 | 1.7 | 1.7 |
| Tack free (hrs) | 3.2 | 4.25 | 6.3 | 3.25 | 5.3 | 5.5 | >8 |
| 6 hr Early rain resistance (60° gloss before/after) | 116/114 | 117/98.3 | 112/112 | 118/113 | 111/112 | 112/112 | 116/79.8 |
| 1 day Pendulum hardness (König seconds) | 106.4 | 112 | 99.4 | 123.2 | 99.4 | 86.8 | 33.6 |
| 14 days Pendulum Hardness (König seconds) | 152.6 | 163.8 | 144.2 | 169.4 | 161 | 147 | 168 |

[1]Wt % solids based on total polyol and polyisocyanate solids.

The formulations in Table 9, above, were mixed by simple mixing using a benchtop air-powered mixer. The resulting coatings were drawn down on a chromate treated aluminum panel with a wet film applicator with a 7 mil (178 micron) gate clearance to give an average dry coating thickness of 56 microns and were dried at room temperature.

Tables 9 and 10, above, provide high solids (60%) formulations and properties of polyurethane coatings containing different tertiary amine catalysts. In comparison to DBTDL in Comparative Example L, each of the tertiary amine catalysts in inventive urethane coatings made from Trimer 1 improve tack free time, enhance gloss after early rain exposure and increase König hardness development. Only one tertiary amine catalyst in Example 11 does not improve the pot life of the coating composition; however, all inventive examples improve the ratio of pot life to tack free time.

We claim:

1. A two-component polyurethane composition that is substantially free of organotin catalysts comprising:
as one component, a polyisocyanate composition having one or more isocyanurate made from bis(isocyanatomethyl)cyclohexane, as a second component, one or more high solids polyol, and, in either or both component, one or more tertiary amine catalyst chosen from aliphatic tertiary amine, cyclo-aliphatic tertiary amine, and mixtures thereof, wherein the high solids polyol has a solids content ranging from 60 to 100 wt. %, based on the total weight of polyol and solvent.

2. The composition as claimed in claim 1, further comprising one or more zinc amine compound.

3. The composition as claimed in claim 1, wherein the high solids polyol is an acrylic polyol or a polyester polyol having two or more primary hydroxyl groups.

4. The composition as claimed in claim 1, wherein the polyisocyanate composition having isocyanurates is made from a mixture of a 1,3- and 1,4-bis(isocyanatomethyl)cyclohexane.

5. The composition as claimed in claim 1, wherein the one or more tertiary amine catalyst is chosen from triethylene diamine (TEDA), a Diazabicyclo[5.4.0]undec-7-ene compound, and other tertiary amine compounds.

6. The composition as claimed in claim 5, wherein the amount of the one or more tertiary amine catalysts ranges from 0.1 to 1 wt. % based on total polyisocyanate and polyol solids, and the amount of the other tertiary amine catalyst ranges from 0.2 to 4.0 wt. % based on total polyisocyanate and polyol solids.

7. The composition as claimed in claim 1, wherein in the component having the polyisocyanate, the composition further comprise one or more polyisocyanate composition having isocyanurates made from an aliphatic diisocyanate.

8. The composition as claimed in claim 1, which is a two-component polyurethane pigmented or clear coat coating composition.

9. A coating made from the composition as claimed in claim 1 further comprising a coated substrate.

* * * * *